United States Patent [19]

Bergmann

[11] Patent Number: 4,492,436
[45] Date of Patent: Jan. 8, 1985

[54] POLARIZATION INDEPENDENT BEAM SPLITTER

[75] Inventor: Ernest E. Bergmann, Fountain Hill, Pa.

[73] Assignee: AT&T Bell Laboratories, Murray Hill, N.J.

[21] Appl. No.: 455,003

[22] Filed: Jan. 3, 1983

[51] Int. Cl.³ .............................................. G02F 1/01
[52] U.S. Cl. .................................... 350/395; 350/401; 350/405
[58] Field of Search .............................. 350/394–395, 350/400–402, 405, 170–174; 372/105–106

[56] References Cited

U.S. PATENT DOCUMENTS 3,510,198  5/1970  Pace ...................................... 350/405
3,675,986  7/1972  Yamamoto et al. .................. 350/405
3,677,621  7/1972  Smith .................................... 350/405
4,084,883  4/1978  Eastman et al. ...................... 372/106

Primary Examiner—William H. Punter
Attorney, Agent, or Firm—Peter V. D. Wilde

[57] ABSTRACT

A new type of beam splitter is described, which is capable of producing a division of light in a polarization independent manner. Typical beam splitters (used off-axis) have a pronounced polarization dependence. The device is a thin plate of suitably oriented, birefringent material having a thickness chosen to interchange the characteristic polarizations of the beam between the faces of the plate. The reflection/refraction ratio at the two boundaries are then complementary and the combined effect is insensitive to the polarization of the incident beam.

4 Claims, 2 Drawing Figures

POLARIZATION INDEPENDENT BEAM SPLITTER

BACKGROUND OF THE INVENTION

Typical beam splitters consist of a surface that reflects a portion of the incident light and transmits much of the remaining light. Knowledge and control of the ratio of the reflected to transmitted beams is important for power monitors and for interferometers as well as in other applications. If the polarization of the incident light is unknown or varies, then the polarization dependence of the beam splitter may limit the accuracy of the splitting ratio.

It is well known how to estimate the reflection and transmission of light for oblique incidence on an interface between two media. General formulas for the TE and TM polarization cases are known as Fresnel Equations. See, for example, J. M. Bennett and H. E. Bennett, "Polarization", Handbook of Optics, W. G. Dricoll, Ed. (McGraw-Hill, 1978) ISBN-0-07-04710-8.

The terminology, TE and TM, is not commonly used with regard to Fresnel Equations. "Transverse-Electric" and "Transverse-Magnetic" describe which field is perpendicular both to the plane of incidence and to the Z-axis; the Z-axis is chosen so that it is perpendicular to the plane of the interface, so that it is in the plane of incidence.

In older optics texts the subscripts, s and p, "senkrecht" and "parallel" are used in this connection. The equations invariably show that the s and p (TE and TM) reflectivities are different, with the s (TE) reflection being the larger. For example, for light incident at 30 degrees at an air-glass interface, the intensity reflection coefficients are 5.74% and 2.51%.

Metallic coatings show polarization dependence when used as beam splitters. Intuitively, for metallic conductors, the coating is so thin it can be thought of as conductive islands or droplets of dimensions small compared to the wavelength of light. These reflects the light by reradiating as if they were tiny dipole radiators. The effective orientation of the dipoles depends upon the polarization of the existing radiation, and, thus, the reflection is not polarization independent.

Another complication for slab beam splitters used with beams having random polarization is the undesirable reflections from the second surface. Two approaches commonly used to minimize effects of reflections from the second surface are less than ideal. The two faces are sometimes not mutually parallel so their reflections may be separated; utilizing a stop to remove the undesired reflection results in a polarization-dependent loss. The other approach is to produce an anti-reflection coating. However good, anti-reflection coatings that are polarization independent for oblique incidence are difficult to make.

To obtain a practical appreciation of the polarization dependence of typical metal coatings, we measured the ratio of reflected to transmitted light of a commercial calibrated circular gradient neutral density disk using 6828 Å light incident at 45 degrees. FIG. 1 shows our results. Curve A(C) is for TE(TM) polarization. Curve B is for a linear polarization at 45 degrees to the plane of incidence, and is probably representative of the values that would be obtained if unpolarized light had been used. Notice that the polarization dependence is consistently larger than 4 db.

Thus, conventional beam splitters do not provide accurate power division when used with beams having random polarization.

DESCRIPTION OF THE INVENTION

My invention is to use a pair of closely spaced, parallel surfaces which, individually, have a very polarization dependent behavior. In our experimental device, we used air-quartz interfaces at Brewster's angle. The principal reason that the resulting beam splitter is polarization independent is that the bulk material between the two interfaces converts the TE polarization to TM and vice versa.

Figure 1:
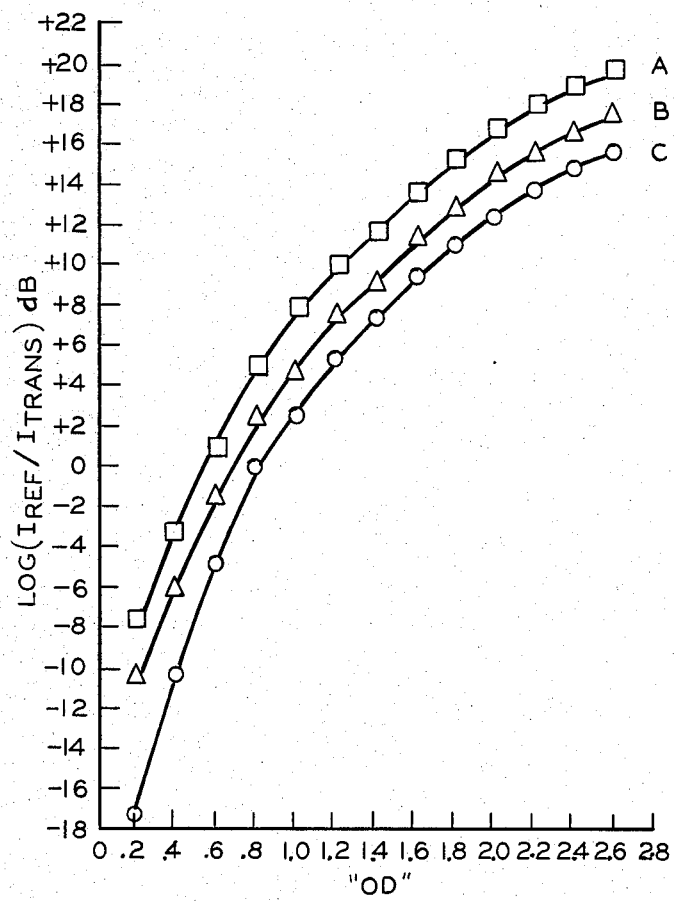
FIG. 1 shows the polarization dependence of typical metal coated beam splitters.
Figure 2:
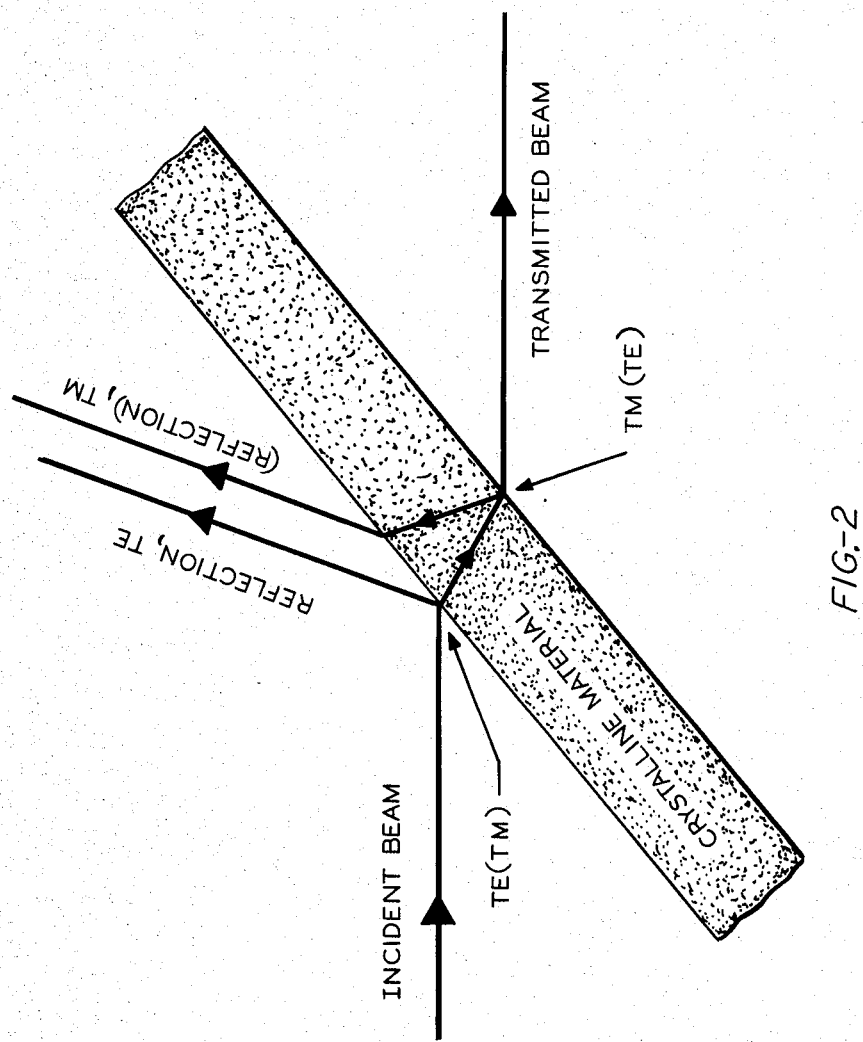
FIG. 2 shows operation of the inventive device in cross section.

There are several ways that bulk material can convert the polarization. The method used here is birefringence. However, it should be understood that the invention is not limited to operation based on birefringence. The device described is generic in the sense that the mechanism and material chosen to effect conversion of TE(TM) to TM(TE) is a matter of design choice. Materials such as lithium niobate or lithium tantalate, certain liquids e.g. sugar solutions, even plastics and stressed glasses may be found suitable to effect the conversion. I have chosen birefringence because an appropriate material, quartz, is readily available. The remainder of this description will rely on this mechanism and material. For this device to be successful, the orientation of the optic axis of the device is important, and the thickness of the plate should be chosen with regard to the wavelength used. FIG. 2 shows the operation of the device in cross-section. Using quartz as the birefringent material, and 6328 Å light from a He-Ne laser, the thickness of the plate should be 63.4 μm (or any odd multiple thereof). The optic axis is not illustrated but lies in the bisecting plane between the incident light and reflected light directions. It is tilted out of the plane of the drawing by 28.5 degrees.

Interaction of the light with the beam splitter is illustrated in FIG. 2 The incident beam may be polarized, partially polarized, or unpolarized. For generality, we suppose that the incident polarization is TE(TM). For this polarization, about 17% (0%) of the light intensity is reflected at the first interface. The light that is refracted has its polarization changed to TM(TE) when it reaches the exit surface. The exit interface reflects 0% (17%) of the light intensity.

If we ignore possible interference effects and multiple reflections, 17% of the incident light is reflected, regardless of polarization. In fact, there are no multiple reflections because only the TE polarization has a reflection at the second interface; when the reflection returns to the entrance surface, it will have reverted to TM polarization and not be reflected at this interface at all.

There are no interference effects between the two reflections arising from the two interfaces. The reflection from the first interface has its electrical polarization perpendicular to the plane of incidence, whereas the reflection from the second face, after retraversing the crystalline plate, will be polarized in the plane of incidence. Thus, the two reflections are orthogonally polarized and will not interfere.

Our measurements were performed with light from a He-Ne laser operating at 6328 Å. The detectors were a pair of United Detector Technology (UDT) Model 255 photodiodes. The readings were made using a UDT Model 550 fiber optics meter operating in the "log ratio" mode. The results of measuring the ratio of the reflected to transmitted light is about 7 db. Its constancy with respect to rotation of the plane of polarization of the incident light is of the order of 0.1 db or better.

The alignment of the crystalline plate was performed as follows. The plate was tilted at the estimated Brewster's angle and its optic axis aligned (by rotating the plate in plane) so that it lay in the plane of incidence. A Nicol prism was placed in the incident laser beam to control the polarization. By rocking the angle of the plate, by rotating the polarizer, and by twisting the plate in plane, one could obtain virtually no reflection. This alignment corresponds to Brewster's angle and TM polarization; additionally, the optic axis is precisely in the plane of incidence.

The plate must now be rotated 90 degrees in plane, placing the optic axis in the plane that is bisecting the incident and reflecting beam directions. This rotation is characterized by increasing the observed reflection to a maximum.

The device is now aligned for polarization independent performance, as can be verified by rotating the Nicol prism.

The ratio observed for our polarization independent device varied from 6.6 db to 7.2 db, depending upon precise alignment of the detector heads. However, for fixed positions of the detectors, rotating the polarizer, which fixed the plane of polarization of the incident light, caused variations of the order of 0.1 db or less.

Clearly the performance of our device shows a polarization insensitivity of close to two orders of magnitude improvement over conventional beam splitters used at large deflection angles.

The calculation of the plate orientation and thickness relationships, and the reflection effects for a uniaxial medium is given by the following.

Assuming the index of refraction of quartz for light at $\lambda = 0.633$ $\mu$m is 1.55, we calculate that Brewster's external (internal) angle, $\theta_B$ ($\theta_{Bi}$) is 57.1 degrees (32.9 degrees).

The direction of the optic axis is chosen to appear to be at 45 degrees to the plane of incidence when projected into the pair of planes perpendicular to the refracted beam and internally reflected beam directions. These requirements force the optic axis to be in the bisecting plane of the refracted and internally reflected beam directions. We calculate the angle, $\theta_z$, which the optic axis makes to the normal of the air-quartz interface, $$\tan \theta_Z = \cos \theta_B \quad (1)$$

Thus, the optic axis is to be tilted 28.51 degrees from the normal of the plate.

The angle the refracted ray makes to the optic axis, $\phi$, is found from:

$$\cos \phi = \sin \theta_B \cdot \cos \theta_Z \quad (2)$$

Thus, $\phi$ is about 42.5 degrees.

The effective index of refraction for the extraordinary ray depends upon the angle the ray makes with respect to the optic axis, whereas the ordinary ray is unaffected. Consequently, the effective birefringence, $\Delta n$, for quartz is approximately:

$$\Delta n = (0.00905) \sin^2 \phi$$

The factor, (0.00905) corresponds to the estimated value of $|n_E - n_O|$ for quartz at $\lambda = 0.633$.

The refracted light is traveling obliquely through the crystalline plate so the plate thickness, d, divided by the path length is $\sin \theta_B$. As a result, the desired plate thickness is:

$$d = \frac{N\lambda}{2} \frac{\sin \theta_B}{(.00905) \sin^2 \phi}, \quad (3)$$

(N is any odd integer) which is about 63.4 $\mu$m for the wavelength of our experiment.

Using Eq. (1), (2) and (3) and substituting a general birefringent material constant k for the 0.00905 factor, Eq. (3) simplifies as follows:

$$d = \frac{N\lambda}{2} \frac{\sin \theta_B}{k \sin^2 \phi}$$

Eq. (2) and $\sin^2 \phi = 1 - \cos^2 \phi$ gives:

$$\sin^2 \phi = 1 - \cos^2 \theta_Z \sin^2 \theta_B$$

from(1) $\quad \cos \theta_B = \tan \theta_Z = \dfrac{\sin \theta_Z}{\cos \theta_Z}$ $$\cos^2 \theta_B = \frac{1 - \cos^2 \theta_Z}{\cos^2 \theta_Z}$$

$$\cos^2 \theta_B \cos^2 \theta_Z = 1 - \cos^2 \theta_Z$$

$$(1 + \cos^2 \theta_B) \cos^2 \theta_Z = 1$$

$$\cos^2 \theta_Z = \frac{1}{1 + \cos^2 \theta_B}$$

$$\sin^2 \phi = \frac{2 \cos^2 \theta_B}{1 + \cos^2 \theta_B}$$

and $\quad d = \dfrac{N\lambda}{4k} (1 + \sec^2 \theta_B) \sin \theta_B$

To estimate the fraction of the incident light that is reflected, we use the intensity formula for TE reflection at an interface:

$$R = \cos^2 (2\theta_B)$$

Thus, for our experiment, we calculate R=16.8%, which corresponds to the ratio of reflected to transmitted light of 6.95 db.

It should be understood that the invention is applicable to any form of electromagnetic radiation that exhibits both significant reflection and significant transmission from the interfaces of the beam splitting element. While the interfaces are typically solid-air interfaces, other media may be more suitable for certain applications.

Various additional modifications and extensions of this invention will become apparent to those skilled in the art. All such variations and deviations which basically rely on the teachings through which this invention has advanced the art are properly considered to be within the spirit and scope of this invention.

What is claimed is:
1. Device comprising:
a beam splitting element,
means for directing a beam of electromagnetic radiation onto the beam splitting element,
means for utilizing the portion of the beam that is reflected by the beam splitting element, and
means for utilizing the portion of the beam that is refracted by the plate beam splitting element,
the invention characterized in that the beam splitting element comprises a first interface reflecting a portion of the incident beam and a second interface reflecting a portion of the beam refracted from the first interface and means between the first and second interface for converting the characteristic polarization TE(TM) to TM(TE) so that the characteristic polarization of the beam incident on the second interface is substantially the complement of the characteristic polarization of the beam incident on the first interface and the combined amount of light that is reflected at both interfaces is independent of the characteristic polarization of the beam.

2. A light beam splitter comprising:
a plate of optically transparent material with a thickness d,
means for directing a beam of monochromatic light of wavelength $\lambda$ onto a major surface of the plate,
means for utilizing the portion of the monochromatic beam that is reflected by the plate, and
means for utilizing the portion of the monochromatic beam that is refracted by the plate,
the invention characterized in that:
a. the material of the plate is birefringent with the optic axis at an angle $\theta_Z$ measured from the normal to the plate at the point of incidence of the beam in a plane normal to the plane containing the incident and reflected beams,
b. the beam is incident on the plate at approximately Brewster's angle, $\theta_B$,
c. the angle $\theta_Z$ is approximately $\tan^{-1} \cos \theta_B$,
d. the approximate thickness d of the plate is in accordance with:

$$d = \frac{N\lambda}{4k} (1 + \sec^2 \theta_B) \sin \theta_B$$

where N is any odd integer and k is a material constant expressing birefringence.

3. The device of claim 2 in which is material is quartz.

4. The device of claim 1 in which the beam splitting element is birefringent.

* * * * *